Figure 7:
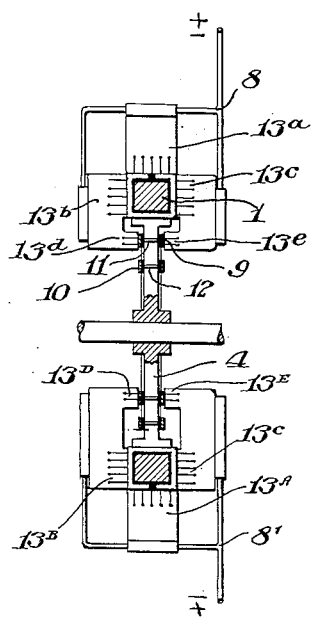

Feb. 17, 1925.
C. HERING
ELECTRIC MACHINE
Filed June 8, 1923    2 Sheets-Sheet 1
1,526,980
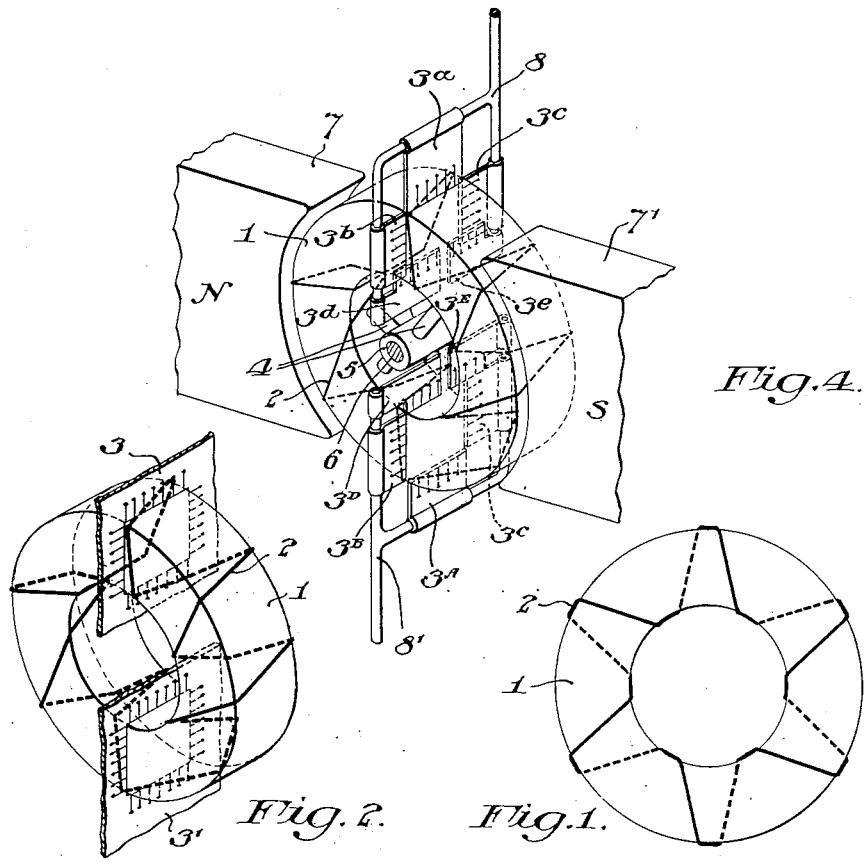
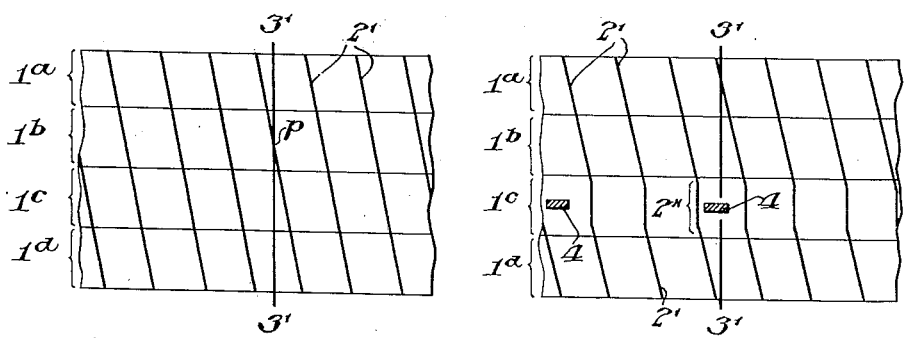
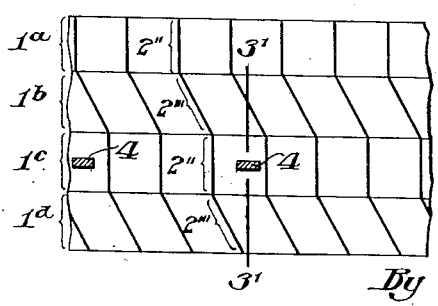
Inventor
Carl Hering,
By
Attorneys Feb. 17. 1925.                                                     1,526,980
C. HERING
ELECTRIC MACHINE
Filed June 8, 1923                2 Sheets-Sheet 2

Inventor:
Carl Hering,
By
Attorneys.

Patented Feb. 17, 1925.

1,526,980

UNITED STATES PATENT OFFICE.

CARL HERING, OF PHILADELPHIA, PENNSYLVANIA.

ELECTRIC MACHINE.

Application filed June 8, 1923. Serial No. 644,107.

*To all whom it may concern:*

Be it known that I, CARL HERING, a citizen of the United States, residing in the city of Philadelphia, county of Philadelphia, and State of Pennsylvania, have invented certain Improvements in Electric Machines, of which the following is a specification.

This invention is an electric machine, applicable to use as a generator or motor, which eliminates the usual commutator of direct current machines, without restriction to the limitations of the so-called unipolar or homopolar machines.

In the usual direct current machines, the brushes necessarily bridge over the insulation between two adjacent commutator bars and as these are connected to the ends of one of the armature coils, that coil is thereby short circuited by a brush. When a brush leaves a bar a current is started through the corresponding coil. Both of these actions tend to produce sparking which is injurious to both the brushes and the commutator, as is well known, and at times of abnormal currents tend to produce destructive flashing. Furthermore this cutting in and out of armature coils produces a pulsating current which is very objectionable when used for telephony, by wire or wireless.

In all types of unipolar or homopolar machines, the armature conductor or circuit embraced between two complementary brushes can cut the field but once. When additional armature conductors are incorporated so as to cut the field more than once additional sliding contact brushes are required for interconnecting the ends of the armature conductors outside of the armatures. To induce currents of substantial voltages from such machines necessitates a very intense field, very high speed (with consequent high brush surface speed) or the use of a multiplicity of brushes.

My improvements obviate the defects and secure the advantages of both commutator and unipolar machines by providing a closed or endless armature winding having a plurality of turns or coils simultaneously subject to the inductive influence of a magnetic field between complementary brushes each of which continuously makes sliding contact with the armature winding. Neither brush is at any given time in contact with separated points or portions of the armature winding, but each brush is at all times in contact with the winding, hence there can be no short circuiting of any armature coil nor any interruption and starting of the flow of current in any armature coil due to the action of the brushes. The length between the brushes of the winding in which current is induced is continuously constant, as distinguished from the abrupt changes in length due to cutting in and out of coils by the brushes inherent in commutator machines. Consequently sparking or flashing at the brushes is avoided and the current produced is free of the usual pulsations and has a steadiness similar to that of battery current.

Figure 9:
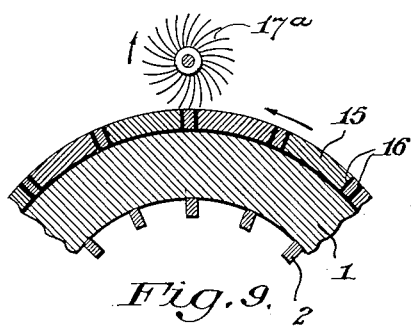
Figure 8:
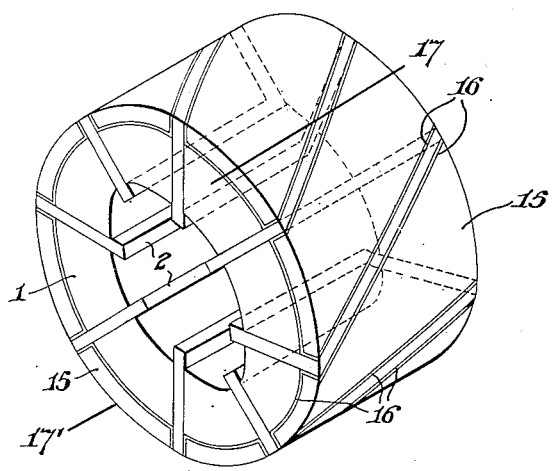

In the accompanying drawings, Fig. 1 is a side elevation of a ring armature core made in accordance with my invention; Fig. 2 is a diagrammatical perspective view of the same provided with a pair of oppositely disposed brushes through which the ring is adapted to revolve, so that each brush shall always be in constant contact at only one point with the conductor wound spirally on the ring; Fig. 3 is a diagrammatic view showing a development of the surface of a section of the armature of Fig. 2 in relation to the contacting surface or edge of one of the brushes; Fig. 4 is a perspective view of a ring armature mounted on a driving shaft, revoluble between pole pieces and with its spiral or approximately spiral winding in constant contact with oppositely disposed brushes; Fig. 5 is a diagrammatic view showing a development of the surface of a section of the armature of Fig. 4 in relation to the developed contacting surface of one of the brushes; Fig. 6 is a diagrammatic view of a development of the surface of a section of an armature ring having brush contact with its sides only, the parts of the winding on the outer and inner surfaces of the ring being in planes parallel to the axis of revolution and the parts on the sides of the ring being inclined to the radius passing through the section; Fig. 7 is a part sectional diagrammatic view taken in a plane containing the axis of a modified form of armature and contacts; Fig. 8 is a perspective of an armature ring wound with a conductor having parts of its winding oblique to the ring elements, with brushes shown diagrammatically and Fig. 9 is a broken sectional view of the armature shown in Fig. 8 taken at right angles to its axis together with a brush related to the winding as illustrated in Fig. 8 and revoluble by the action of the revolving armature thereon.

Referring to Figs. 1 and 2, the construction illustrated comprises an armature ring 1, a conductor 2 spirally wound thereon so as to form a closed circuit and insulated from the iron core but bare on the outside surface, and a brush or connected brushes 3 and 3' in contact with which the armature winding is adapted to revolve so that each compound brush maintains a point of contact constantly with the conductor and at one point only. A part of the surface of the armature is developed as illustrated in Fig. 3; the band 1$^a$ represents the developed cylindrical peripheral surface; the band 1$^b$ a plane side or face; the band 1$^c$ the cylindrical interior surface; the band 1$^d$ the second plane side or face, and the line 3'—3' the developed compound edge of one of the brushes in constant contact with one of the sections 2' of the developed conductor, at one point only, as at $p$.

As illustrated in Fig. 4, the ring 1 is provided with the spokes 4 and the hub 5 fixed on the shaft 6, has the winding 2, and is provided with the pole pieces 7 and 7' together with the compound brush or electrically connected brushes 3$^a$, 3$^b$, 3$^c$, 3$^d$ and 3$^e$ and 3$^A$, 3$^B$, 3$^C$, 3$^D$ and 3$^E$, the two compound or connected brushes being carried by the respective conducting frames 8 and 8'. Considering that a part of the armature surface is developed as illustrated in Fig. 5, then the bands 1$^a$, 1$^b$, 1$^c$ and 1$^d$, representing respectively the cylindrical peripheral surface, a plane side, the cylindrical interior surface and the second plane side of the armature, will be crossed by the spiral winding sections 2'—2' modified by the sections 2'' extending at right angles to the band 1$^a$ or parallel to the axis of revolution in the armature. The developed brush contact surface or line 3'—3' is modified by a break for the passage of the spokes 4 and corresponding to the open space between the brushes 3$^d$ and 3$^e$ and that between the brushes 3$^D$ and 3$^E$ in Fig. 4. Each compound brush will always be in continuous contact with the winding for, as will be seen from Fig. 5, the ends of the line 3'—3' separated for the passage of the spokes, will make contact simultaneously with the advancing section 2'', that is, before one free end of the brush line leaves the winding the other will be in contact therewith.

In Fig. 6 there is shown diagrammatically the development of a part of the surface of the armature in which parts 2'' of the winding on the cylindrical surfaces 1$^a$ and 1$^c$ of the armature ring are parallel to the axis while the alternate sections 2''' in contact with the opposite plane faces 1$^b$ and 1$^d$ of the ring, are inclined to the axial planes passing through the respective sections 2''. The compound brush represented by the line 3'—3', broken to permit the passage of the spokes 4, makes continuous contact with the sections 2''' so that contact with the sections 2'' is unnecessary and a core having teeth on its face can be used.

In Fig. 7 there is illustrated a modified construction in which continuity of contact is secured by the use of an armature ring 1 having spokes 4 with conducting rings 9 and 10 insulated therefrom but fixed thereto by the conducting bolts 11 and 12, in combination with the respective compound brushes 13$^a$, 13$^b$, 13$^c$, 13$^d$ and 13$^e$ carried by the frame 8 and 13$^A$, 13$^B$, 13$^C$, 13$^D$ and 13$^E$ carried by the frame 8'; the brushes 13$^a$, 13$^A$ contacting with the periphery of the armature, 13$^b$, 13$^c$, 13$^B$, 13$^C$ with the sides, 13$^d$, 13$^e$ with the rings 9 and 13$^D$, 13$^E$ with the rings 10. The current induced in the winding of this armature flows through the brushes 13$^a$, 13$^b$, 13$^c$, and 13$^A$, 13$^B$, 13$^E$ with which the respective rings 9 and 10 make sliding contact and through the respective frames 8 and 8'; the rings 9 and 10 moving in constant contact with the respective brushes eliminating any tendency to fluctuation in the current by providing paths to the leads $\pm$ and $\mp$ of the frames.

With a laminated field it is evident that such a machine can be used also as a non-synchronous, variable speed alternating current motor. The speed could be varied by a transformer of adjustable voltage.

The construction illustrated in Figs. 8 and 9 provides means designed for avoiding wear on the insulation between adjacent convolutions or turns of the armature winding or the bars corresponding thereto, the insulation between adjacent sections of the winding being much wider than that between usual commutator bars. This is effected by providing the periphery of the ring 1 with the skewed metal sections 15 (which may be of iron to reduce the air gap) separated from the ring proper and the continuous spirally wound conductor 2 by the insulation 16. Brushes 17, 17', indicated diagrammatically in Fig. 8, make constant contact with the cylindrical surface of the armature provided by the peripheral sections of the winding 2 and the peripheral plates 15, each brush being in constant contact with a peripheral section of the winding since an approaching section engages the brush as a receding section leaves it.

As illustrated in Fig. 9, wear may be avoided where very high speeds are used by the use of revoluble brushes 17$^a$ in place of the brushes 17 and 17', the revoluble brushes turning at a rate which is proportioned to that of the armature as conditions may require.

Many of the well known details of construction can be applied to this machine.

Thus the pole pieces may embrace three sides of the armature to reduce the reluctance of the air gap; the pole pieces may be laminated; the pole tips may terminate at an angle; the machine may be made multipolar; it may be operated as an induction motor when the armature brushes are short circuited, or through a regulating resistance, the current being supplied to the field as a stator.

Having described my invention, I claim:

1. An electric machine having means forming a magnetic field and an armature comprising a winding, one of said members being movable relatively to the other, in combination with a pair of brushes each making sliding contact with said winding and having continuously only a single point of sliding contact with the winding, said winding having a plurality of turns between the points of contact therewith of the brushes aforesaid.

2. An electric machine having means forming magnetic poles, an armature revoluble between said magnetic poles, and having a winding of more than one turn, and a pair of brushes separated by said magnetic poles, each of said brushes having constantly only a single point of sliding contact with the winding of said armature.

3. An electric machine having means forming magnetic poles, an armature revoluble between said magnetic poles and having a continuous approximately spiral winding, and a single pair of contact brushes separated by said magnetic poles and each contacting at only a single point of said winding.

4. An electric machine having an armature with approximately spiral winding, a single pair of oppositely disposed brushes each making constant sliding contact with the winding and having continuously only a single point of sliding contact with the winding, and means forming a magnetic field cut a plurality of times by the winding between the brushes.

5. An electric machine having means forming a magnetic field, an armature wound with spaced convolutions revoluble in said field, and brushes separated by said field, each of said brushes adapted for making sliding contact with said convolutions constantly and at one point only.

6. An electric machine having means forming a magnetic field, an armature wound with spaced convolutions revoluble in said field, and a single pair of compound brushes separated by said field, each of said brushes adapted for making sliding contact with said convolutions on several surfaces of the armature ring.

7. An electric machine having means forming a magnetic field, an armature comprising a conductor having a plurality of turns simultaneously subject to the inductive action of said magnetic field, and brushes each making sliding contact with said conductor and having continuously only a single point of sliding contact with the winding.

8. An electric machine having means forming a magnetic field, an armature, and complementary brushes each continuously contacting with said armature, said armature comprising an endless conductor forming between its connections with said brushes a plurality of conductor members simultaneously cutting said field and discharging through said brushes, the length of such conductor member comprised between two brushes being continuously constant.

9. An electric machine having means forming a magnetic field, an armature, and complementary brushes each continuously contacting with said armature over an endless surface, said armature comprising an endless conductor forming between its connections with such brushes a plurality of conductor members simultaneously cutting said field and discharging through said brushes.

10. An electric machine having means forming a magnetic field and an armature comprising a winding, one of said members being movable relatively to the other, in combination with a pair of brushes each making sliding contact with said winding, said winding having a plurality of turns between the points of contact therewith of the brushes aforesaid and all of said turns having current deliverable by the machine always flowing therein.

11. An electric machine having an armature with approximately spiral winding, a pair of oppositely disposed brushes each making constant sliding contact with the winding through the entire length of which current deliverable by the machine always flows, and means forming a magnetic field cut a plurality of times by the winding between the brushes.

12. An electric machine having means forming a magnetic field, an armature, and complementary brushes each continuously contacting with said armature, said armature comprising an endless conductor forming between its connections with such brushes a plurality of conductor members simultaneously cutting said field and forming at all times a path in one direction only on each side of the points of contact of said brushes and conductor.

In testimony whereof I have hereunto set my name this 6th day of June, 1923.

CARL HERING.